US005511807A

United States Patent [19]
Snyder

[11] Patent Number: 5,511,807
[45] Date of Patent: Apr. 30, 1996

[54] WHEELED HAMPER

[76] Inventor: James A. Snyder, 25342 Kerri La., Ramona, Calif. 92065

[21] Appl. No.: 238,378

[22] Filed: May 5, 1994

[51] Int. Cl.$^6$ ........................ B62B 1/16

[52] U.S. Cl. ........................ 280/47.26; 220/335; 220/908

[58] Field of Search ........................ 220/908, DIG. 14, 220/335, 337; 280/47.26, 651, 47.24, 47.17

[56] References Cited

U.S. PATENT DOCUMENTS

| | | | |
|---|---|---|---|
| D. 229,663 | 12/1973 | Morita . | |
| D. 256,423 | 8/1980 | Bacskay et al. . | |
| 2,015,999 | 10/1935 | Frank | 220/335 X |
| 3,712,652 | 1/1973 | Uilkema | 280/823 X |
| 3,752,550 | 8/1973 | Niemeyer . | |
| 4,050,708 | 9/1977 | Samardzija et al. . | |
| 4,126,213 | 11/1978 | McDonald . | |
| 4,193,164 | 3/1980 | Okayama | 220/335 X |
| 4,288,102 | 9/1981 | Ramer | 280/823 |
| 4,460,105 | 7/1984 | Cox | 220/335 X |
| 4,585,283 | 4/1986 | Redmon et al. . | |
| 4,596,397 | 6/1986 | Conti . | |
| 4,789,078 | 12/1988 | Miller et al. | 220/908 X |
| 5,048,715 | 9/1991 | Wolff | 220/335 |
| 5,071,024 | 12/1991 | Delmerico et al. | 220/335 |
| 5,323,923 | 6/1994 | Schauer | 220/908 X |

*Primary Examiner*—Margaret A. Focarino
*Assistant Examiner*—Michael Mar
*Attorney, Agent, or Firm*—Thomas J. Tighe

[57] ABSTRACT

A wheeled hamper has a hinged lid that freely pivots between a closed position and a position, preferably past ninety degrees, at which the lid is latched into place by a releasable catch mechanism. In the latched position, the lid can be used as a handle to tilt the hamper and wheel it. In a second embodiment, the lid has at least one stable position intermediate the closed position and the latched position. It can be held there by detents which can be released by appliying a torque to the lid as opposed to the catch mechanism which in its preferable form does not release simply by application of a torque. This provides a way to keep the hamper open when it is in stationary use and to conveniently close it after such use by simply pulling on the lid as opposed to going through a procedure to release the catch mechanism. Two embodiments of catch mechanisms are disclosed. Other features are also disclosed.

6 Claims, 2 Drawing Sheets

WHEELED HAMPER

BACKGROUND OF THE INVENTION

This invention relates in general to wheeled hampers (as "hamper" is defined below), and in particular to those having a dual purpose cover—for closing the hamper and for controlling the hamper during wheeling.

As used herein the term "hamper" refers to a bin, generally manageable by one person, with a cover for packing, storing, or transporting articles in general, for example: clothes and food hampers, household trash bins, toy bins, shopping baskets, and the like. The prior art shows wheeled hampers but none with such a dual purpose cover.

U.S. Pat. No. 4,596,397 by Conti describes basically a shopping bag wheeled support. The wheel support is like a dolly to which the base of the bag is attached. The mouth of the bag is closed by gathering it into a tight fold which is inserted into the slot of a clamping device. The clamping device also has a handle portion by which a person can pull the bag on its dolly.

U.S. Pat. No. 4,585,283 by Redomon et al. describes a wheeled frame that can hold multiple hamper bags. It has a hinged cover or lid. The patent does not teach nor suggest that the lid be used as a handle for wheeling the frame.

U.S. Pat. No. 4,126,213 by McDonald describes a wheeled, collapsible suitcase with a latchable top.

U.S. Pat. No. 4,050,708 by Samardzija et al. describes a hamper and a cart. The hamper is shown with a lid hinged to a box section but the lid is obviously not used as a handle for wheeling the hamper.

U.S. Pat. No. 3,752,550 by Niemeyer describes another wheeled hamper with a side mounted handle for wheeling. This hamper can be hidden in a furniture enclosure.

U.S. Pat. No. Des. 256,423 by Bacskay et al. shows a hamper with a hinged lid and back wheels. However, the lid is not used as a handle for wheeling the hamper. The lid is actually hinged to the side bars of a handle. The hamper would be unstable if one were to try and negotiate it on its wheels using the lid.

U.S. Pat. No. Des. 229,663 by Morita is also a design patent showing a wheeled hamper with a hinged lid. However, there is a side handle for negotiating the hamper. Nothing indicates that the hamper can be negotiated by using the lid as a handle.

Advantages and attributes of this invention will be readily discernable upon a reading of the text hereinafter.

SUMMARY OF THE INVENTION

An object of this invention is to provide a wheeled hamper having a dual functional hinged lid: for opening and closing the hamper and for locking in a position for use as an extended handle for wheeling the hamper.

These objects, and other objects expressed or implied in this document, are accomplished by a wheeled hamper having a bin with an open top and a base, and also having wheels or wheel equivalents (e.g. casters) affixed at the base for wheeling the bin when it is tilted onto the wheels. The bin also has a lid hinged to the rim of the open top. The lid can be pivoted between a closed position at which the lid closes the bin and a latched position at which preferably the bin is fully opened. The hamper also has a catch mechanism for latching the lid at the latched position. When latched, the lid can be used as a handle and lever for tilting, wheeling and manuevering the hamper. The catch can be released when desired to allow the lid to resume its function as a lid. A second embodiment has a position intermediate the closed and latched positions at which the lid can be stable, i.e. remain in place. The lid is held in the intermediate position by detents that unlike the catch mechanism release when a torque is applied to the lid. In this way the bin can be kept open without using the catch mechanism, and closed by simply applying sufficent torque to overcome the detents.

DESCRIPTION OF THE PREFERRED EMBODIMENT

Figures 1, 2, 3, 4, 5:
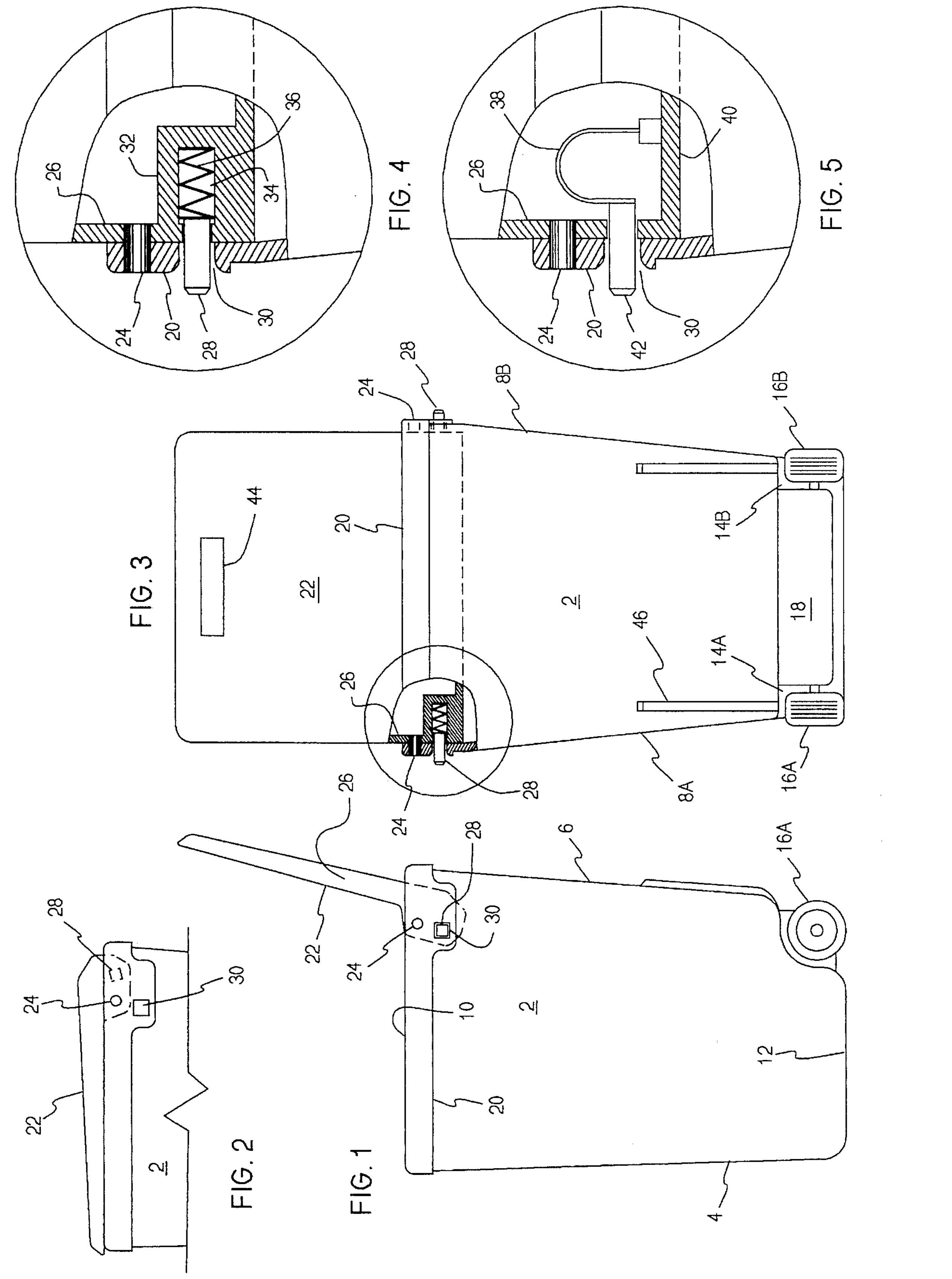
FIG. 1 is a side elevational view of a hamper according to this invention with its lid raised and locked into position for use as a handle for wheeling the hamper.
FIG. 2 is a partial side elevational view of the same hamper as in FIG. 1 but with the lid in its closed position.
FIG. 3 is a rear elevational view of the hamper shown in FIG. 1 with a portion around a left (relative to a viewer) hinge shown in cross-section for clarity of understanding.
FIG. 4 is an expanded view of the circled portion of FIG. 3.
FIG. 5 is an expanded view of a second embodiment of the circled portion of FIG. 5.

Referring to FIGS. 1–4, a hamper bin 2 has front wall 4, a rear wall 6 and side walls, 8A and 8B. It also has an open top 10 and a closed bottom 12. At opposite back bottom corners of the bin are wheel wells, 14A and 14B, defined by the side and back walls and the bottom of the bin. Disposed in the wheel wells are respective wheels, 16A and 16B, both connected to the bin by respective axles affixed to a portion 18 of the base of the bin protruding therebetween. For hamper bins made from less than rigid plastic (as are many conventional clothes hampers and trash bins), the rim 20 of the open top of the bin can be reinforced as illustrated.

Referring again to FIGS. 1–4, a bin lid 22 is pivotally affixed at opposite sides to the bin side walls near the back of the bin for rotating between a closed position, as shown in FIG. 2, and a "latched" position as shown in FIG. 1. The lid pivots on a pair of pivot pins 24 that are affixed in bores defined by the reinforced rims of the side walls and that are journaled in corresponding lid flanges 26 projecting normally from the side margins of the lid. The lid can pivot freely between the closed position at which it closes the top of the bin (FIG. 2) and the latched position at which the top is fully open (FIG. 1). At the latched position the lid is latched in place by a pair of releasable catch mechanisms disposed at respective back corners of the lid. Each catch mechanism has a spring-loaded post 28 that projects laterally outward through holes defined by respective lid flanges 26 near the back of the lid. When the posts align with corresponding catch holes 30 defined by the side walls of the bin near respective pivot pins, the posts are urged to extend through the catch holes. This occurs when the lid is moved to its latched position as shown in FIGS. 1 and 3. As long as the posts protrude through the catch holes, the lid will be held in the latched position, and the lid can be used as a lever to tilt the hamper and control it while wheeling the hamper. The lid can be released from the second stable position by pushing the posts inward and out of their respective catch holes. Preferably the catch holes are large enough to insert a finger and so a person can release the lid by pushing both posts in with index fingers and shoving the lid forward with thumbs.

Referring to FIG. 4, a first embodiment of a catch mechanism has a housing 32 which is integral with a respective back corner of the lid. The housing defines a post retraction chamber 34. Within the post retraction chamber is a coil spring 36 affixed to a back end of the post 28. The post retraction chamber is aligned with the post and so pushing on the post will contract the spring and push the post into the chamber to remove it from the catch hole 30.

Referring to FIG. 5, a second embodiment of the catch mechanism has a "J" shaped leaf spring 38 having a long end affixed to a lid back flange 40, and having a short end affixed to the back end of a catch post 42. The leaf spring urges the post to protrude laterally outward through an opening defined by a respective side flange 26 of the lid. When the post is aligned with the catch hole 30, the leaf spring further urges the post to protrude through the catch hole, and thereby latching the lid in the latched position. The catch can be released using the same method as described above for the first embodiment of the catch mechanism.

Referring to FIGS. 1 and 3, additional features of the hamper are illustrated. The lid 22 preferably has a hand hole or indentation 44 for the convenience of gripping the lid, especially when it is being used a lever to maneuver the hamper. Also, extending vertically above the wheels are skid strips 46 affixed to the back of the bin to prevent damage to the bin when the hamper is being wheeled up or down stairs. They act to buffer the bin from impacts against the edges of the stairs.

Figure 8:
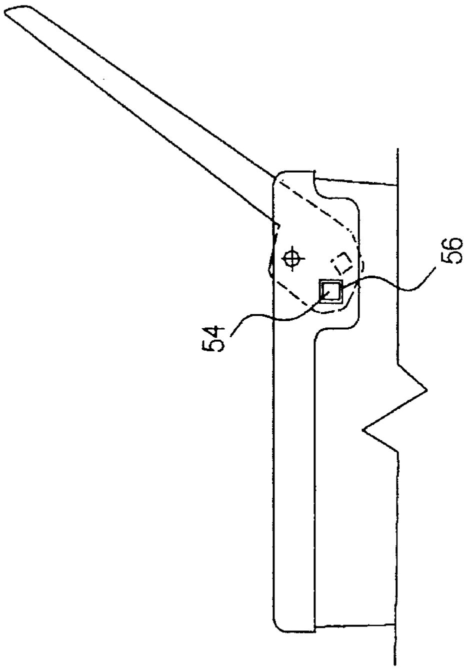
FIG. 8 is a partial side elevational view of the same hamper as in FIG. 6 but with the lid locked into position for use as a handle.
Figure 9:
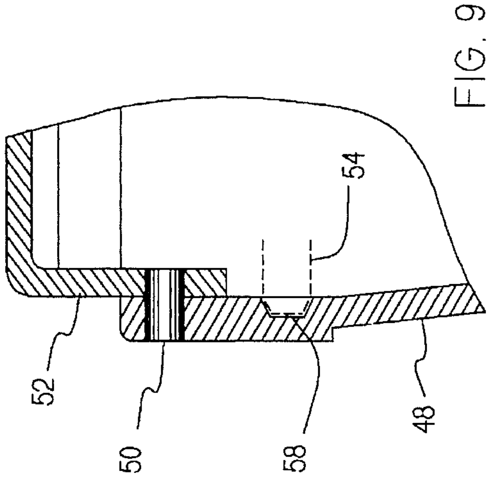
FIG. 9 is a cross-sectional view taken along line 9—9 of FIG. 6.
Figure 6:
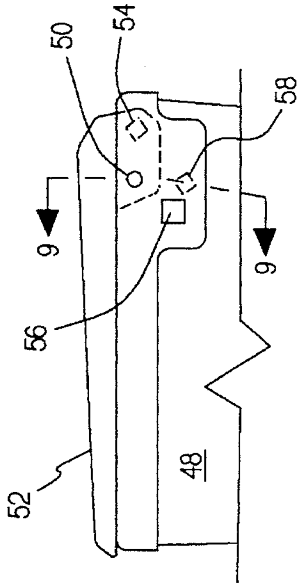
FIG. 6 is a partial side elevational view of a second embodiment hamper with the lid in its closed position.
Figure 7:
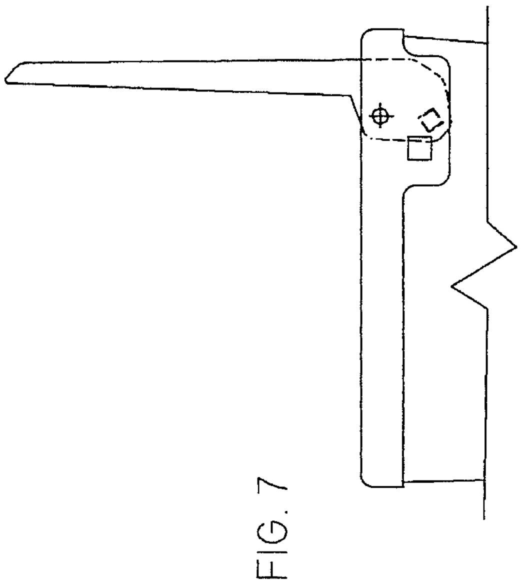
FIG. 7 is a partial side elevational view of the same hamper as in FIG. 1 but with the lid in a stable open position.

Referring to FIGS. 6–9, a second embodiment of the hamper is illustrated to have a bin 48, a pair of pivot pins 50 for hinging a lid 52, a pair of catch posts 54 and corresponding catch holes 56 for latching the lid for use as a handle, all as in the first embodiment. In addition, the lid can be i.e., stationary, in a third position (FIG. 7) that is intermediate the closed position at which the lid closes the bin's top (FIG. 6) and the position at which the lid is latched by the catch mechanism (FIG. 8). The lid is held in the intermediate position by a pair of recesses 58 defined by the inside surfaces of respective bin side walls at the rim. Each recess is directly in the arc path traveled by a corresponding catch post as the lid is pivoted between the other two stable positions. Each recess is sized to catch the tip of its corresponding catch post to hold the lid in place. However both the recesses and the posts' tips are tapered so that the tips can be readily dislodged from the recesses by applying a torque to the lid. In this way the recesses and their corresponding catch posts function as detents to keep the bin open without using the catch mechanism, and the detents can be released simply by applying a sufficient torque to the lid. This is advantageous when the hamper is in repeated stationery use.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims. For example, the pivot connections between the hamper bin and the bin lid can be sockets defined by the bin walls and corresponding integral posts protruding from the sides of the lid, or vice versa. As another example, the walls, lid, and/or the bottom of the bin can be perforated and/or made from mesh or mesh-like material.

I claim:

1. A wheeled hamper comprising:

(a) a bin having an open top and a base, (b) wheel means, affixed at the base of the bin, for wheeling the bin when it is tilted onto said wheel means, (c) lid means, pivotally affixed to a rim of the open top, for being pivoted between a closed position at which the lid means closes the open top and a fully opened latched position, (d) means for releasably latching the lid means at the fully opened latched position, the means for latching securing the lid means in relation to the bin sufficiently to allow use of the lid means as a handle for tilting and wheeling the bin, the means for latching including biased catch posts receivable within corresponding aligned openings, and (e) means for holding the lid means stable at a position intermediate the closed and latched positions which includes recesses alignable with the biased catch posts.

2. The hamper according to claim 1 wherein the lid means when in the fully opened latched position is inclined away from the bin.

3. The hamper according to claim 1 wherein the bin top is fully opened when the lid means is in the fully opened latched position.

4. The hamper according to claim 1 wherein the means for latching comprises a pair of biased catch posts affixed to and projecting laterally from opposite sides of the lid means, and a pair of corresponding catch holes defined by opposite inside walls of the bin, corresponding catch posts and catch holes being alignable within a pivot range of the lid means, the bias on each catch post urging it into its corresponding catch hole when they are aligned.

5. The hamper according to claim 1 wherein the recesses comprises a pair of inward facing recesses defined by opposite inside walls of the bin, the pair of corresponding biased posts affixed to and projecting laterally from opposite sides of the lid means, corresponding recesses and posts being alignable within a pivot range of the lid means intermediate the closed position and the fully opened latched position, the bias on each post urging it into its corresponding recess when they are aligned and the posts being releasable from the recesses by a torque applied to the lid means.

6. A wheeled hamper comprising:

(a) a bin having an open top and a base, (b) wheel means, affixed at the base of the bin, for wheeling the bin when it is tilted onto said wheel means, (c) lid means, pivotally affixed to a rim of the open top, for being pivoted between a closed position at which the lid means closes the open top and a fully opened latched position, (d) catch means for latching the lid means at the latched position comprising a pair of biased catch posts affixed to and projecting laterally from opposite sides of the lid means, a pair of corresponding catch holes defined by opposite inside walls of the bin, corresponding catch posts and catch holes being alignable within a pivot range of the lid means, the bias on each catch post urging it into its corresponding catch hole when they are aligned, (e) means for releasing the catch means, and (f) detent means for holding the lid means stable at a position intermediate the closed and latched positions comprising a pair of inward facing recesses defined by opposite inside walls of the bin, the pair of biased posts and corresponding recesses being alignable within a pivot range of the lid means intermediate the closed position and the latched position, the bias on each post urging it into its corresponding recess when they are aligned, the posts being releasable from respective recesses by a torque applied to the lid means sufficient to overcome the biases of the posts.

* * * * *